US011497088B2

(12) United States Patent
Bayerlein et al.

(10) Patent No.: US 11,497,088 B2
(45) Date of Patent: Nov. 8, 2022

(54) INDUCTION COOKING HOB WITH ILLUMINATION EQUIPMENT

(71) Applicant: ELECTROLUX APPLIANCES AKTIEBOLAG, Stockholm (SE)

(72) Inventors: Stefan Bayerlein, Rothenburg ob der Tauber (DE); Jochen Holzinger, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/414,567

(22) PCT Filed: Dec. 3, 2019

(86) PCT No.: PCT/EP2019/083454
§ 371 (c)(1),
(2) Date: Jun. 16, 2021

(87) PCT Pub. No.: WO2020/126467
PCT Pub. Date: Jun. 25, 2020

(65) Prior Publication Data
US 2021/0360751 A1 Nov. 18, 2021

(30) Foreign Application Priority Data
Dec. 17, 2018 (EP) ..................... 18212849

(51) Int. Cl.
*H05B 6/12* (2006.01)
*H05B 6/02* (2006.01)

(52) U.S. Cl.
CPC ......... *H05B 6/1218* (2013.01); *H05B 6/1245* (2013.01); *H05B 2206/022* (2013.01)

(58) Field of Classification Search
CPC .......... H05B 6/02; H05B 6/12; H05B 6/1218; H05B 6/1245
(Continued)

(56) References Cited

U.S. PATENT DOCUMENTS

| 2013/0098901 A1* | 4/2013 | Corleoni | .................. H05B 6/02 |
| | | | 219/620 |
| 2015/0013660 A1 | 1/2015 | Holzinger | |
| 2015/0145868 A1* | 5/2015 | Lee | .......................... G06F 3/14 |
| | | | 345/441 |

FOREIGN PATENT DOCUMENTS

| DE | 102007042978 | 3/2009 |
| EP | 1437920 | 7/2004 |

(Continued)

OTHER PUBLICATIONS

International Search Report and Written Opinion for PCT/EP2019/083454, dated Jan. 3, 2020, 7 pages.

*Primary Examiner* — Quang T Van
(74) *Attorney, Agent, or Firm* — Pearne & Gordon LLP

(57) ABSTRACT

An induction cooking hob (1) with illumination equipment includes a cover element (2) arranged at the top side of the induction cooking hob and including at least one heating zone, a chassis (5) arranged below the cover element (2) and at least one induction coil unit (3) having an induction coil (10). The induction coil unit (3) is arranged below the at least one heating zone. According to the invention, a light emitting diode (4) is mounted to the center of the at least one induction coil unit (3). Thermal conductive contact between the light emitting diode (4) and the chassis (5) is provided by a spring element (12) pressing at least a surface of the light emitting diode (4) onto the chassis (5).

13 Claims, 5 Drawing Sheets

(58) Field of Classification Search
USPC ....... 219/620, 460, 621, 622, 623, 624, 625,
219/626, 627; 345/441
See application file for complete search history.

(56) References Cited

FOREIGN PATENT DOCUMENTS

| | | |
|---|---|---|
| EP | 2458285 | 5/2012 |
| EP | 3139702 | 3/2017 |

\* cited by examiner

INDUCTION COOKING HOB WITH ILLUMINATION EQUIPMENT

CROSS-REFERENCE TO RELATED APPLICATIONS

This application claims priority to, and any other benefit of prior application no. EP 18212849.6 filed on Dec. 17, 2018, the entire disclosure of which is incorporated by reference as though recited herein in its entirety.

FIELD OF THE INVENTION

The present invention relates to an induction cooking hob with illumination equipment.

BACKGROUND

Induction cooking hobs with illuminating equipment are known, amongst others, from DE 20 2012 003 287 U1, EP 2 458 285 A1 or EP 2 405 713 A1.

Known induction cooking hobs in particular comprise a cover element arranged at the top side of the induction cooking hob and including at least one heating zone, a chassis forming arranged below the cover element, at least one induction coil unit mounted to the chassis. The induction coil unit includes an induction coil for heating cookware placed on top of the cover element. At least one induction coil unit is arranged below the at least one heating zone. Induction cooking hobs include illuminating equipment such as one or more light emitting diodes, in particular for indicating heating zones.

In particular, it is known to mount a high-power light emitting diode (LED), for example via its printed circuit board, to a chassis made from aluminium by means of an adhesive tape to provide thermal conductivity such that heat generated during operation may be dissipated.

BRIEF SUMMARY

It is an object of the present invention to provide an induction cooking hob including illumination equipment with reliable heat dissipation.

This object is achieved by an induction cooking hob as disclosed herein.

An induction cooking hob with illumination equipment comprises a cover element arranged at the top side of the induction cooking hob and including at least one heating zone, a chassis arranged below the cover element and at least one induction coil unit including an induction coil. The induction coil unit is arranged below the cover element in an area below the at least one heating zone.

According to the invention, a light emitting diode is mounted to the center of the at least one induction coil unit, in particular such that the light emitting diode is in the center of the induction coil. Thermal conductive contact between the light emitting and the chassis is provided by a spring element pressing at least a surface of the light emitting diode onto the chassis.

One aspect of the invention relates to mounting the light emitting diode (LED), in particular a high-power light emitting diode, to the center of the at least one induction coil. The light emitting diode and the induction coil may form a single assembly unit. This facilitates assembly of the induction cooking hob and improves the tolerance chain, because the light emitting diode is already directly affixed to the induction coil.

The arrangement of the invention has the benefit of a simplified geometry, ease of assembly and reduced tool costs. Wrong assembly of the light emitting diode may be avoided.

The arrangement of the invention includes the benefit of reducing the number of parts that need to be assembled. Consequently, the assembly workflow is improved. Tool costs for assembly or in case when the location of the cooking zones have to be altered subsequently may also be reduced.

Another aspect of the invention relates to the thermal dissipation of the heat generated by the at least one light emitting diode. In particular, thermal dissipation is provided by the thermal contact of the at least one surface of the light emitting diode and the chassis. The spring element is in particular arranged to bias the light emitting diode towards the chassis. For example, an underside of a circuit board, in particular printed circuit board, of the light emitting diode, is pressed onto a surface the chassis by the act of the biased and/or elastically deformed spring element. In this way, thermal conductivity between the light emitting diode and the chassis is established. Connections like adhesive connections that are difficult detach are avoided. This facilitates readjustment of the induction coil unit with respect to the chassis and/or replacement of malfunctioning induction coil units.

Preferably, the chassis is made from a material of good thermal conductivity like, for example, a metal. According to preferred embodiments, the chassis is made from aluminum.

According to a preferred embodiment, the thermal conductive contact between the light emitting diode and the chassis includes a heat conducting tape or a heat conducting foil arranged between the light emitting diode and the chassis. The heat conducting tape or the heat conducting foil has a high thermal conductivity.

Preferably, the heat conducting tape or the heat conducting foil is electrically insulating. The heat conducting tape or the heat conducting foil may in particular be arranged on the underside of the circuit board of the light emitting diode.

According to a preferred embodiment, the spring element is made from silicone. Silicon is a material of suitable resilience for providing a sufficient biasing force to ensure a good thermal conducting contact of the light emitting diode with the chassis. In this sense, the connection between the light emitting diode and the chassis may be provided the by means of a force-fit conveyed by the spring element.

In alternative embodiments, the spring element is made from a plastic material other than silicone. The plastic material has a resilience suitable to bias the light emitting diode towards the chassis. Other suitable materials for the spring elements, in particular metals, are also foreseen and within the scope of this specification.

According to a preferred embodiment, the spring element is arranged as deformable gaiter, half sphere or cone or at least includes a deformable section that has the geometrical shape of a gaiter, half sphere or cone. The spring element is adapted to provide a biasing force towards the chassis when biased and/or deformed.

According to a preferred embodiment, the light emitting diode is snap-fitted to a holder mounted to the center of the at least one induction coil unit, in particular to the center of the at least one induction coil.

According to a preferred embodiment, the holder is made from silicon. The holder may be force-fitted into the center of the at least one induction coil unit. In particular, holders made from a resilient materials such as silicon may be easily force-fitted into the center of the at least one induction coil such as to be located in the center of the induction coil having a general spiral or annular geometry.

According to a preferred embodiment, the spring element is integrated with the holder to form one piece. In other words, the spring element and the holder are arranged as one piece. Preferably, the spring element and the holder are arranged as one piece made from a plastic material, in particular silicone.

According to a preferred alternative embodiment, the spring element is a separate element.

According to a preferred embodiment, the spring element is configured or arranged as a coil spring, a helical spring, a leaf spring, a plate spring or a flat spring. Alternatively, the spring element has a different geometrical layout suitable to exert a biasing force onto the light emitting diode.

According to a preferred embodiment, is the spring element is mounted to a circuit board, in particular the circuit board of the light emitting diode, or an induction unit base plate. For example, the induction unit base plate is part of a casing covering a lower surface of the induction coil.

According to a preferred embodiment, the light emitting diode is mounted to a bottom part of the at least one induction coil. In particular, the at least one light emitting diode may be spaced apart from the cover element in the vertical direction.

According to a preferred embodiment, the cover element is a glass ceramic plate or a glass ceramic panel. In particular, the cover element may include markings, for example printed markings, indicating possible heating zones. In preferred embodiments, the cover element does not include printed markings indicating heating zones. Alternatively or supplementary to printed markings, the heating zones may be indicated by arrangements of light emitting devices such as light emitting diodes or light guides arranged below the cover element or in the cover element.

The cover element may form the top of the induction cooking hob and in particular extends in a horizontal plane perpendicular to the vertical direction.

According to preferred embodiments, the light emitting diode is directly mounted to the at least one induction coil.

BRIEF DESCRIPTION OF DRAWINGS

In the following, the invention is described in more detail with reference to drawings, wherein.

Corresponding elements or parts are indicated in all figures with same reference signs or reference numerals.

DETAILED DESCRIPTION OF INVENTION

Figure 1:
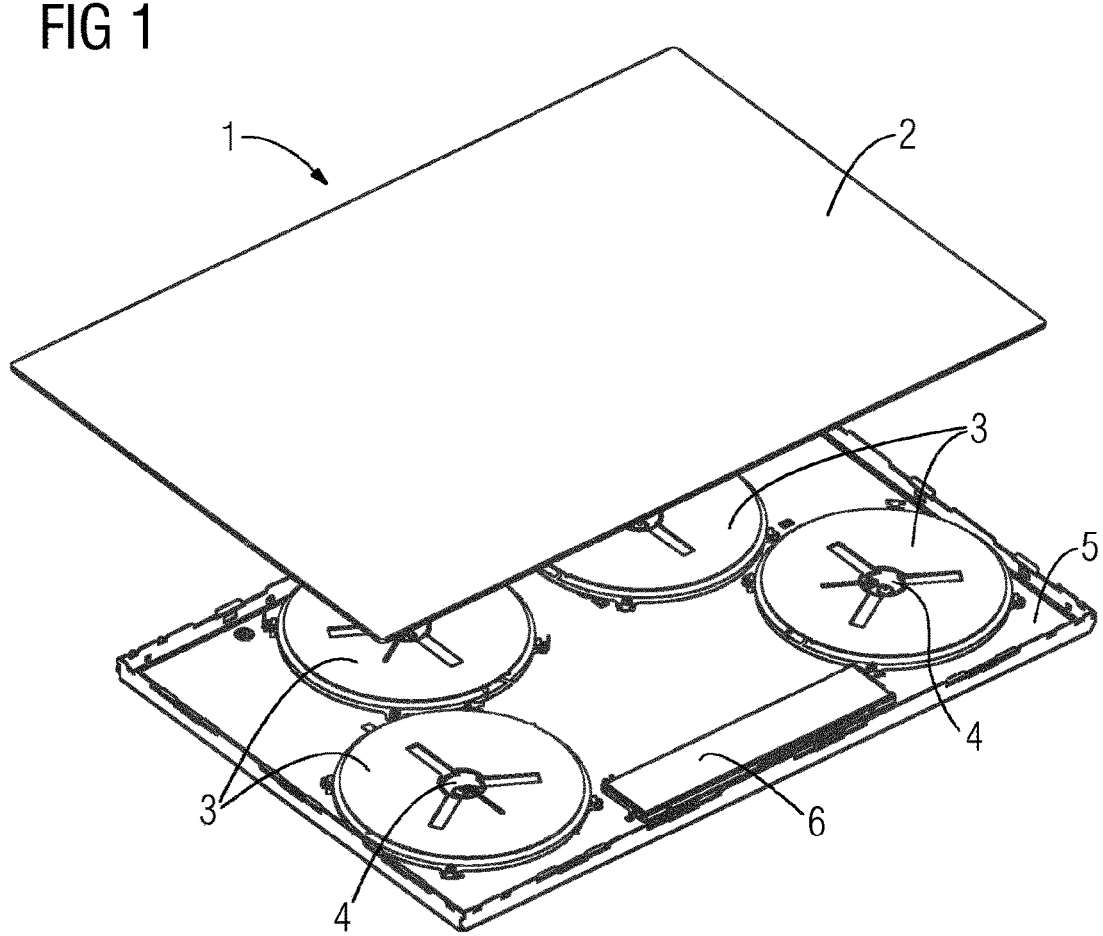
FIG. 1 illustrates an induction cooking hob according to an embodiment of the invention in an exploded view.

FIG. 1 shows an induction cooking hob 1 according to a possible embodiment of the invention in an exploded view. The induction cooking hob comprises a cover element 2 made from glass ceramic. The cover element 2 (also: glass ceramic panel) forms the work-top of the induction cooking hob. The cover element 2 includes four different heating zones that are defined by four induction coil units 3 arranged below the respective areas of the cover element 2. The cover element 2 does not exhibit any printed markings indicating the location of the different heating zones. The heating zones are indicated by illumination equipment, in particular by light emitting diodes 4 arranged below the cover element 2. Each light emitting diode 4 indicating a heating zone is mounted to the center of the corresponding induction coil unit 3.

The induction coil units 3 are mounted to a chassis 5 of the induction cooking hob 1. The chassis 5 is made from aluminium and is capable of conducting heat. A surface of each light emitting diode 4 is in physical contact with the chassis 5 such that heat generated during operation of the light emitting diodes 4 may be dissipated to the chassis 5. Operation of the induction cooking hob 1 is controlled by means of a user interface 6.

Figure 2:
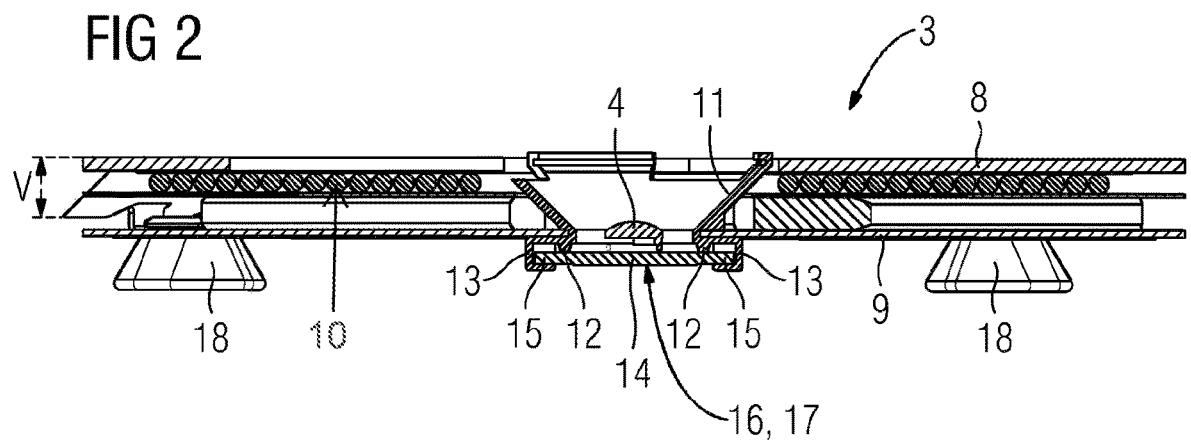
FIG. 2 illustrates an induction coil unit of the induction cooking hob of FIG. 1 in a sectional view.
Figure 3:
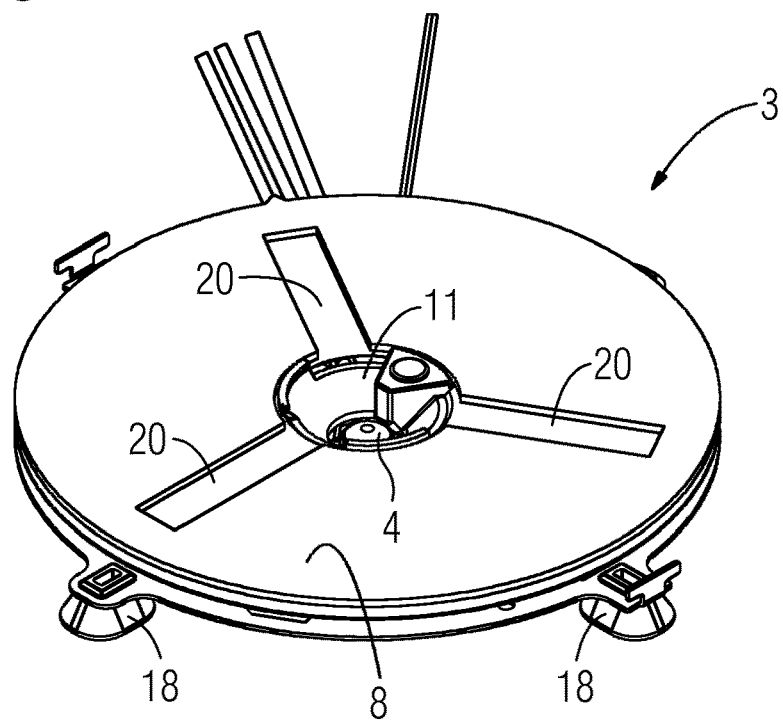
FIG. 3 illustrates the induction coil unit of FIG. 2 in a perspective view.
Figure 4:
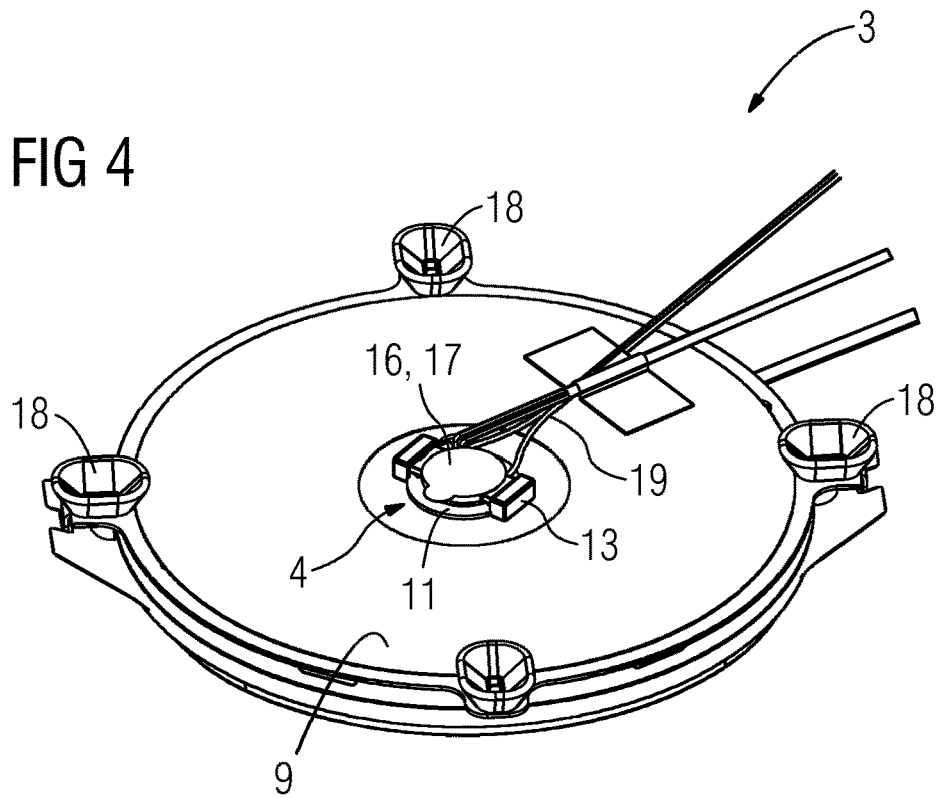
FIG. 4 illustrates another perspective view of the induction coil unit.

FIG. 2 shows the induction coil unit 3 in a sectional view. FIG. 3 shows the induction coil unit 3 as viewed from above. FIG. 4 shows the induction coil unit 3 as viewed from below.

The induction coil unit 3 comprises an induction top plate 8 an induction unit base plate 9 forming a casing. An induction coil 10 is arranged between the induction unit top plate 8 and the induction unit base plate 9. A holder 11 for the light emitting diode 4 is mounted to the center of the induction coil unit 1 and the induction coil 10. The holder is made from silicone and may comprise a light reflecting layer or coating on its inside.

Figure 5:
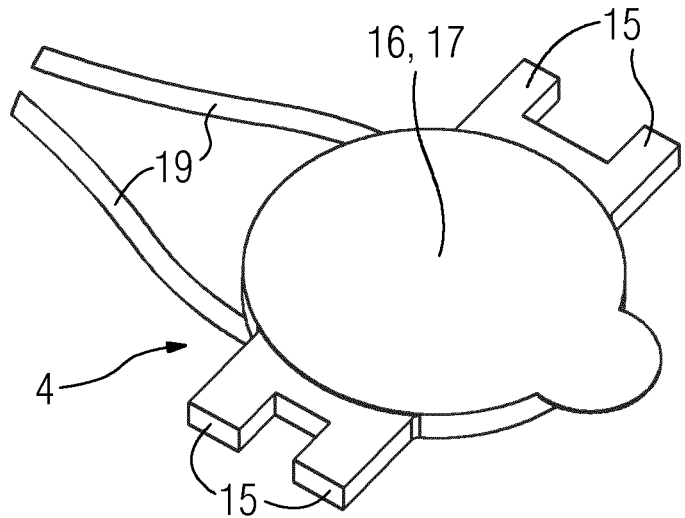
FIG. 5 illustrates a light emitting diode adapted to be mounted to the center of the induction coil unit of FIG. 2 in perspective view.
Figure 6:
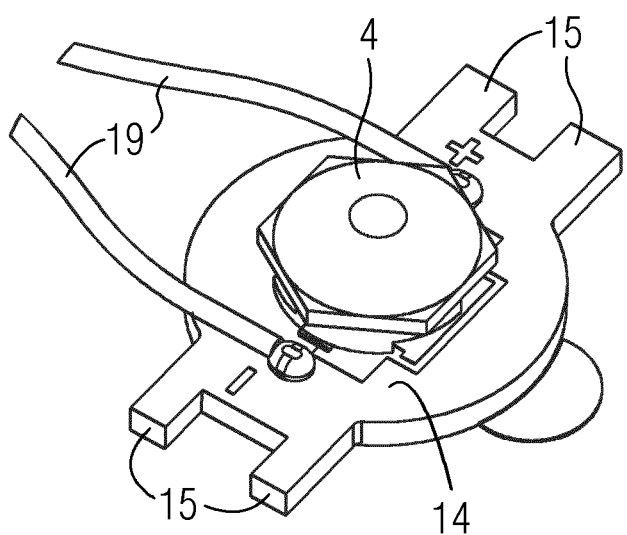
FIG. 6 illustrates another perspective view of the light emitting diode of FIG. 5.
Figure 7:
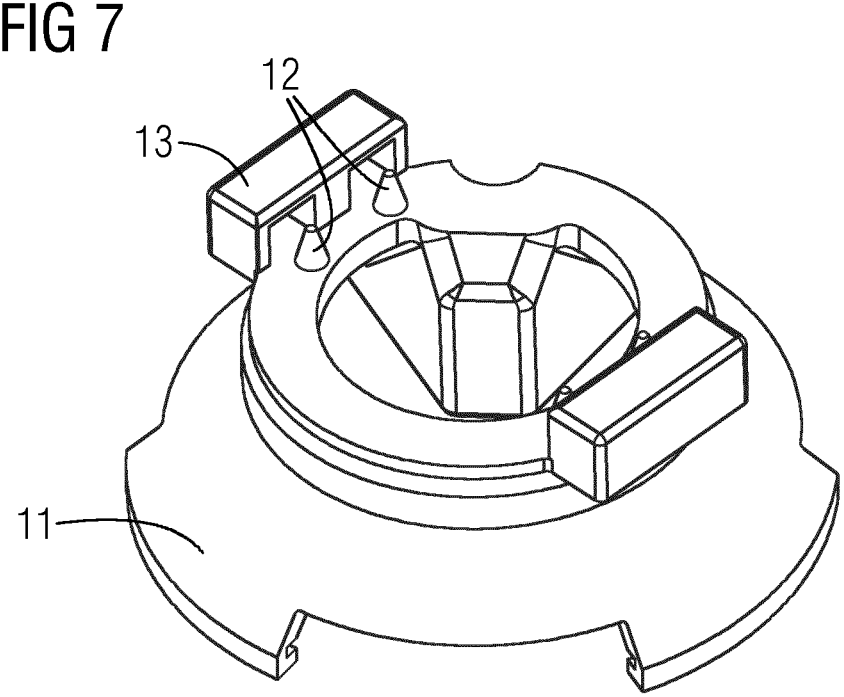
FIG. 7 illustrates a holder for mounting the light emitting diode of FIG. 5 and FIG. 6 to the center of the induction coil unit of FIG. 2 in a perspective view.
Figure 8:
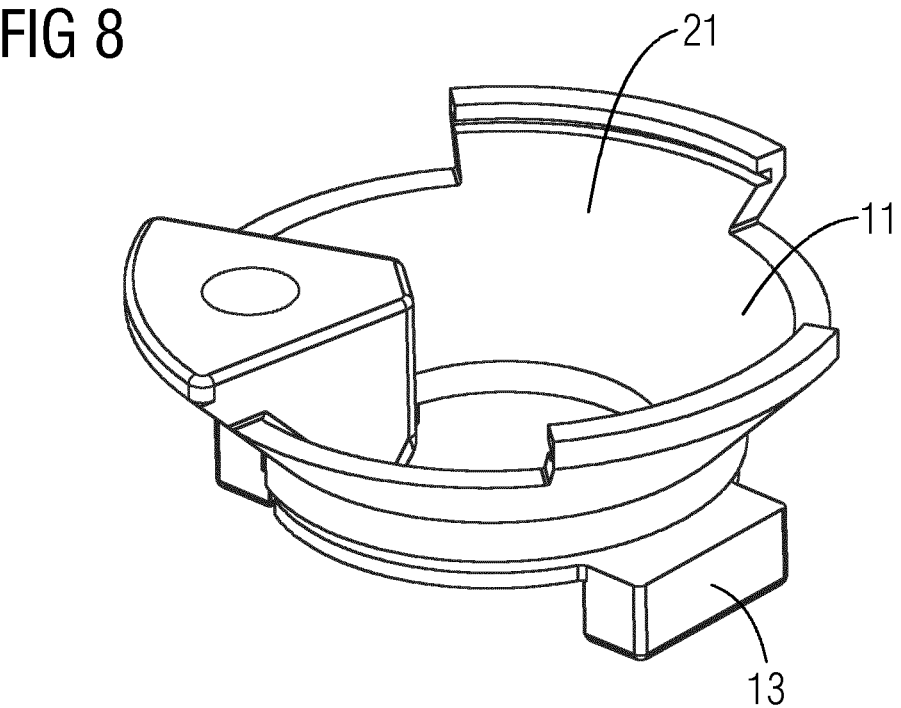
FIG. 8 illustrates another perspective view of the holder of FIG. 7

FIG. 7 shows the holder 11 as viewed from above. FIG. 8 shows the holder 11 as viewed from below. The light emitting diode 4 is illustrated in detail in FIG. 5 and FIG. 6. FIG. 5 shows the light emitting diode 4 as viewed from above. FIG. 6 shows the light emitting diode 4 as viewed from below.

Figure 9:
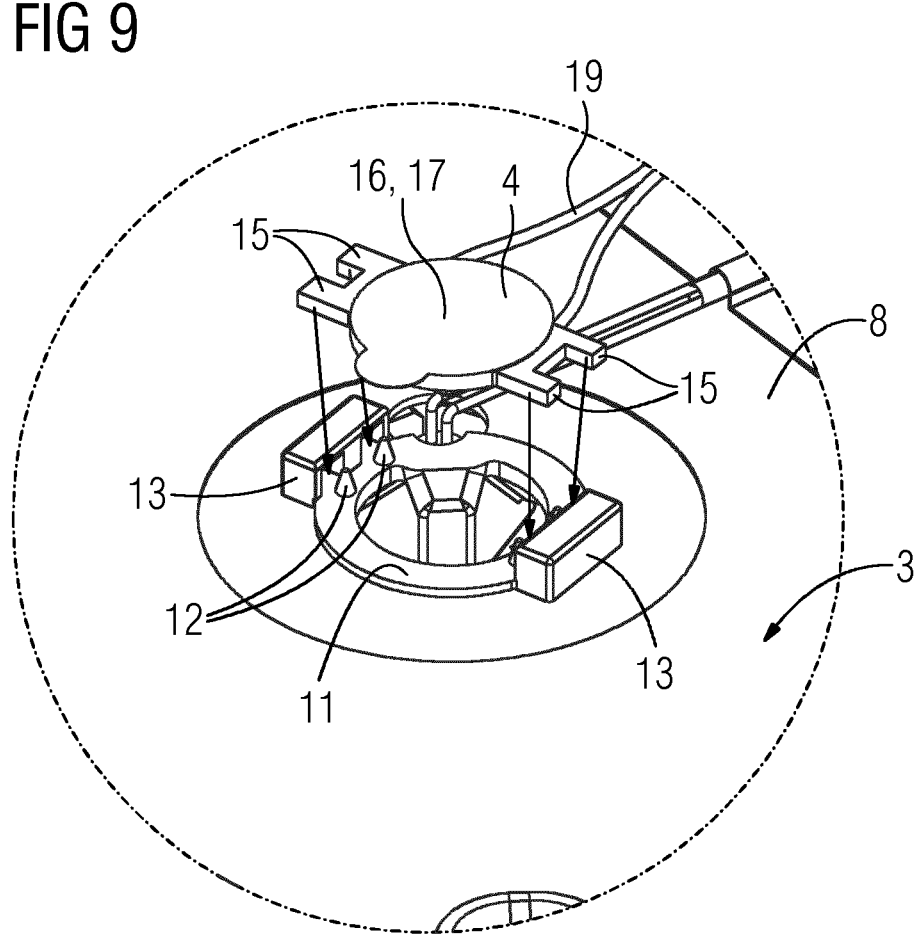
FIG. 9 illustrates the center of the induction coil including the light emitting diode and the holder in an exploded view.

As best seen in FIG. 2 or FIG. 9, the light emitting diode 4 is mounted to a lower part of the holder 11 and the induction coil unit 3 such that it is located at a distance to the induction unit top plate 8 with respect to a vertical direction V. The holder 11 includes cone-shaped sections that act as spring elements 12 (see also FIG. 7) and brackets 13 for mounting the light emitting diode 4 that is affixed on top of a circuit board 14.

The circuit board 14 has projections 15 that are received in the brackets 13. The cone-shaped sections that act as spring elements 12 are deformable and exert a biasing force on the circuit board 14. The projections 15 are clamped between the spring elements 12 and the brackets 13. In other words, the light emitting diode 4 is mounted to the lower part of the holder 11 by means of a snap-fit or force-fit.

The spring elements 12 are arranged in a manner that the circuit board 14 is urged downwardly with respect to the vertical direction V such that an underside 16 of the circuit board 14 is in contact with the chassis 5 in the assembled state. In the assembled state, the induction coil unit 3 is clamped between the cover element 2 and the chassis 5 of the induction cooking hob 1. A heat conducting tape 17 arranged, in particular by means of adhesion, covers a substantial part of the underside 16. The heat conducting tape 17 is in direct physical contact with both the chassis 5 and the underside 16 of the circuit board 14 to provide a thermal conductive connection between these elements. Heat generated by the light emitting diode 4 during operation may thus be dissipated to the chassis.

FIGS. 2 to 4 illustrates the induction coil unit 3 in state before it is assembled in the induction cooking hob 1. Four support elements 18 having the shape of cups are arranged around the periphery of the generally annular induction coil unit 3. The support elements 18 are configured to be placed onto the chassis 5. The support elements 18 are made from a resilient material such as rubber or silicon and are deformed during assembly when the induction coil units 3 are clamped between the cover element 2 and the chassis 5 (see also FIG. 1). In the assembled state, a heat dissipating thermal connection between the light emitting diode 4 and the chassis 5 is provided by a direct contact of the heat conducting tape 17 adhered to the underside 16 of the circuit board 14 and the chassis 5.

As best seen in FIG. 3, the induction unit top plate 8 exhibits three cutouts 20 extending from the center of the induction coil unit 3 in radial directions. During operation, the cutouts 20 are illuminated by light emitting from the light emitting diode located in the center of the induction coil unit 3. The illuminated cutouts 20 indicate heating zones, in particular active heating zones.

As best seen in FIG. 5 or FIG. 6, the circuit board 14 of the light emitting diode 4 is contacted by wires 19. The protrusions 15 on side of the circuit board 14 have a shape that slightly differs from the shape of the protrusions 15 located on the opposite side of the circuit board 14. The geometrical layout of the brackets 13 corresponds to the geometric shape of the protrusions 15 respectively received therein such that the light emitting diode 4 may only be mounted to the holder 11 in the proper orientation.

As best seen in FIG. 7 or FIG. 8, the holder 11 has a generally annular shape. An inner surface may be provided with a light reflecting surface 21 or coating.

Heating zones may be indicated by light illuminated by the light emitting diodes 4 during operation. The snap-fit for the light emitting diode 4 provided by the holder 11 allows for an easy and quick assembly and replacement on the induction coil unit 3 including the light emitting diode 4 as a single unit. A separate and costly affixture of the light emitting diode 4 to the chassis 5, in particular by means of adhesion, at the proper location may be avoided. The induction cooking hob 1 may thus be easily assembled.

LIST OF REFERENCE NUMERALS 1 induction cooking hob
2 cover element
3 induction coil unit
4 light emitting diode
S chassis
6 user interface
8 induction unit top plate
9 induction unit base plate
10 induction coil
11 holder
12 spring elements
13 bracket
14 circuit board
15 protrusion
16 underside
17 heat conducting tape
18 support element
19 wire
20 cutout
21 surface
V vertical direction

The invention claimed is:

1. Induction cooking hob with illumination equipment, comprising: a cover arranged at a top side of the induction cooking hob and including at least one heating zone, a chassis arranged below the cover and at least one induction coil unit having an induction coil, said induction coil unit being arranged below the at least one heating zone, wherein a light emitting diode is mounted to a center of the at least one induction coil unit, wherein thermal conductive contact between the light emitting diode and the chassis is provided by a spring pressing at least a surface of the light emitting diode onto the chassis.

2. Induction cooking hob according to claim 1, wherein the thermal conductive contact between the light emitting diode and the chassis includes a heat conducting tape or a heat conducting foil arranged between the light emitting diode and the chassis.

3. Induction cooking hob according to claim 1, wherein the spring is made from silicone.

4. Induction cooking hob according to claim 1, wherein the spring is arranged as a deformable gaiter, half sphere or cone.

5. Induction cooking hob according to claim 1, wherein the light emitting diode is snap-fitted to a holder mounted in the center of the at least one induction coil unit.

6. Induction cooking hob according to claim 5, wherein the holder is made from silicon.

7. Induction cooking hob according claim 4, wherein the spring is integrated with a holder mounted in the center of the at least one induction coil unit to form one piece.

8. Induction cooking hob according to claim 1, wherein the spring is a separate element.

9. Induction cooking hob according to claim 7, wherein the spring is arranged as a coil spring, a helical spring, a leaf spring, a plate spring or a flat spring.

10. Induction cooking hob according to claim 7, wherein the spring is mounted to a circuit board or an induction unit base plate.

11. Induction cooking hob according to claim 1, wherein the light emitting diode is mounted to a bottom part of the at least one induction coil unit.

12. Induction cooking hob according to claim 1, wherein the cover is a glass ceramic panel or glass ceramic plate.

13. Induction cooking hob according to claim 1, wherein the light emitting diode is directly mounted to the at least one induction coil unit.

* * * * *